May 24, 1949.	H. T. JONES	2,471,328
WATER REGULATOR FOR CATTLE TANKS
Filed Jan. 10, 1947

INVENTOR

Homer T. Jones

Patented May 24, 1949

2,471,328

UNITED STATES PATENT OFFICE 2,471,328

WATER REGULATOR FOR CATTLE TANKS

Homer T. Jones, Ord, Nebr.

Application January 10, 1947, Serial No. 721,370

1 Claim. (Cl. 137—68)

The invention relates to improvements in water regulators for cattle drinking tanks in which a non-freezing fluid, counterbalancing through a diaphragm with the water in the cattle tank, operates an inlet water valve; in this invention, the laws of hydrostatic equilibrium and hydraulics are used in a novel way; and the objects of the improvements are, first, to provide a non-freezing water regulator for cattle drinking tanks that is small and compact and out of the way of cattle or workmen; second, a valve that is very sensitive in its action but at the same time powerful enough to control a large volume of water when needed; and, third, a regulator that will not become inoperative, that is cheap and durable and can be quickly repaired by unskilled workmen.

Figure 1:
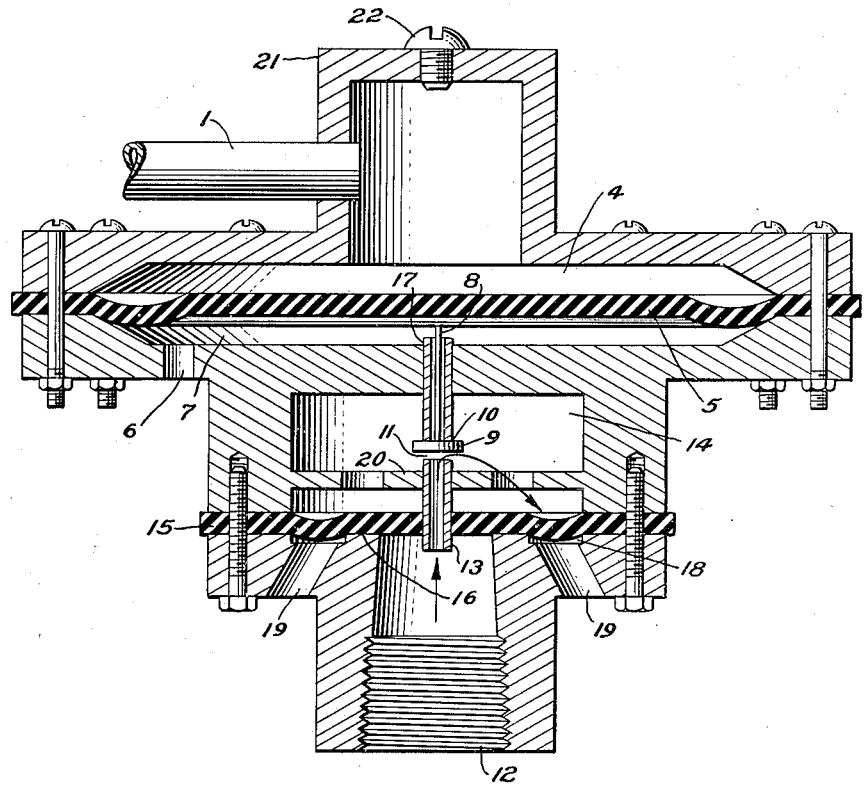
Figure 2:
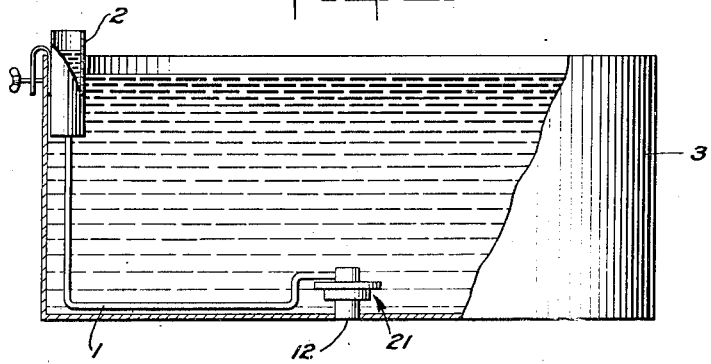

One form of the invention is illustrated in the accompanying drawing, in which Figure 1 is a vertical section of the regulator showing its parts at rest; Figure 2, a plan view of how the regulator is situated in the bottom of a cattle drinking tank and my method of placing a small container of non-freezing fluid upon the edge of the tank which communicates through a conduit and diaphragm with the water in the tank.

The conduit 1, carries the non-freezing fluid from container 2, which is attached to the edge of tank 3 to the space 4, above the diaphragm 5. The conduit 6, allows water in the tank 3 to freely communicate through the space 7, with the diaphragm 5. When the water in tank 3 is lowered, the water pressure in space 7 is lowered, but the fluid pressure in space 4 does not change; thus the diaphragm 5 is moved downward against stem 8, carrying valve 9, away from valve seat 10, and against valve seat 11. The diaphragm 5 is made with a firm central part but with very flexible outer edges.

Water is supplied to the tank 3 under pressure entering conduit 12, and when valve 9 is in a closed position, the water pressure passes up through the conduit 13, into chamber 14, as indicated by the arrows and holds member 15 down against the valve seat 16. Member 15 is made of rubber or other such material and is slidable upon conduit 13. By carrying valve 9 away from valve seat 10 and against valve seat 11, the water in the chamber 14 is allowed to escape through conduit 17. Now, as there is greater pressure in conduit 12 than there is in chamber 14, the member 15 is forced from its valve seat 16 which allows water to flow out into the annular groove 18, and into tank 3 through passages 19 19. This annular groove 18 has many passages as shown at 19 19, so the water will have a free passage from the valve seat 16. The support 20, supports the conduit 13 in position.

When installing these regulators, all air may be allowed to escape from dome 21 by removing plug 22.

It will be seen that by employing a large inlet water valve with a chamber back of it which has small inlet and outlet valves adjacent to each other, only a small amount of effort is needed to control a large volume of water.

I am aware that prior to my invention water regulators have been made with diaphragm operated valves which are controlled through the changing of water pressure in the tank. I therefore do not claim such a combination broadly; but I claim:

The combination with a water regulator situated in the central and bottom part of a cattle drinking tank and having a primary diaphragm, a relatively small in diameter but relatively tall liquid container having means for attaching to the outer and upper edge of said tank, a liquid conveying means adapted to communicate liquid from said container to the upperside of said diaphragm, means whereby water in said tank can freely communicate with the underside of said diaphragm, a main inlet conduit adapted for connecting to a supply pipe of said tank and terminating with a valve seat, a secondary valve diaphragm member its face adapted to close on said valve seat and close said main inlet conduit said secondary valve member being considerably larger in diameter than said valve seat, a chamber back of said secondary valve member having relatively small inlet and outlet conduits which have adjacent valve seats said relatively small inlet conduit being adapted to convey the water pressure from said main inlet conduit into said chamber, a primary valve member situated between said adjacent valve seats, and means whereby a small movement of said primary diaphragm will actuate said primary valve member from one to the other of the said adjacent valve seats.

HOMER T. JONES.

REFERENCES CITED

The following references are of record in the file of this patent:

UNITED STATES PATENTS

| Number | Name | Date |
|---|---|---|
| 495,074 | Vail | Apr. 11, 1893 |
| 1,627,628 | Anderson | May 10, 1927 |
| 1,941,030 | Williams | Dec. 26, 1933 |
| 2,263,252 | Tallman | Nov. 18, 1941 |